United States Patent
Nagata (10) Patent No.: US 7,629,946 B2
(45) Date of Patent: Dec. 8, 2009

(54) DISPLAY APPARATUS

(75) Inventor: Mitsutoshi Nagata, Obu (JP)

(73) Assignee: DENSO CORPORATION, Kariya (JP)

( * ) Notice: Subject to any disclaimer, the term of this patent is extended or adjusted under 35 U.S.C. 154(b) by 378 days.

(21) Appl. No.: 11/642,710

(22) Filed: Dec. 21, 2006

(65) Prior Publication Data

US 2007/0159317 A1 Jul. 12, 2007

(30) Foreign Application Priority Data

Jan. 10, 2006 (JP) ............... 2006-002863

(51) Int. Cl.
G09G 5/00 (2006.01)
(52) U.S. Cl. .............................. 345/7; 345/9
(58) Field of Classification Search ................ 345/7–9; 348/51, 115; 340/461
See application file for complete search history.

(56) References Cited

U.S. PATENT DOCUMENTS

| | | | | |
|---|---|---|---|---|
| 4,804,836 A | * | 2/1989 | Iino | 345/7 |
| 4,868,652 A | * | 9/1989 | Nutton | 345/7 |
| 5,510,983 A | * | 4/1996 | Iino | 345/7 |
| 6,741,223 B2 | * | 5/2004 | Kobayashi et al. | 345/7 |
| 2004/0247175 A1 | * | 12/2004 | Takano et al. | 382/154 |
| 2005/0134479 A1 | * | 6/2005 | Isaji et al. | 345/7 |
| 2006/0103590 A1 | * | 5/2006 | Divon | 345/7 |

FOREIGN PATENT DOCUMENTS

| | | |
|---|---|---|
| JP | A-9-304101 | 11/1997 |
| JP | A-2000-215393 | 8/2000 |
| JP | A-2003-4462 | 1/2003 |
| JP | A-2004-219859 | 8/2004 |
| JP | A-2004-356962 | 12/2004 |

\* cited by examiner

*Primary Examiner*—Regina Liang
(74) *Attorney, Agent, or Firm*—Posz Law Group, PLC (57) ABSTRACT

A display apparatus includes a reflector positioned for obstructing a front view of a driver by using an opaque material, a first imaging unit for imaging a front view of the vehicle, an image generation unit for generating a display image for a portion of the front view that is obstructed by the reflector, an image projection unit for projecting the display image generated by the image generation unit on the reflector, an information acquisition unit for acquiring information to be visually provided for the driver, and a combination unit for combining the information with the display image upon acquiring the information by using the information acquisition unit.

10 Claims, 7 Drawing Sheets

BEFORE ADJUSTMENT      AFTER ADJUSTMENT

BEFORE POSITION CHANGE  AFTER POSITION CHANGE

FIG. 8D

BEFORE ADJUSTMENT  AFTER ADJUSTMENT

DISPLAY APPARATUS

CROSS REFERENCE TO RELATED APPLICATION

This application is based on and claims the benefit of priority of Japanese Patent Application No. 2006-2863 filed on Jan. 10, 2006, the disclosure of which is incorporated herein by reference.

FIELD OF THE INVENTION

The present invention generally relates to a display apparatus used in a vehicle.

BACKGROUND INFORMATION

In recent years, various information is provided for an occupant of a vehicle, and a display apparatus such as a liquid crystal display on a console box is used for visually providing the various information for the occupant.

However, the display apparatus disposed on the console box or the like distracts driver's attention away from an outside view in front of the vehicle, that is, away from a road surface, signal or the like, when the driver being involved in driving operation moves his/her eyes to look at a display screen on the display apparatus in the vehicle.

For coping with a problem involving the eye movement, a display apparatus that projects an image including the various information on a windshield of the vehicle, a so-called "Heads Up Display" system is proposed in, for example, the disclosure of Japanese patent document JP-A-2003-4462. The various information on the windshield is recognized as a virtual image by the driver of the vehicle.

However, the outside view overlapping the projected image on the windshield sometimes makes it difficult for the driver to recognize the information in the projected image when the vehicle is equipped with the Head Up Display system. Further, details of the projected image such as, for example, a map, a route guide or the like is susceptible to an influence of an incident light from an outside of the vehicle. As a result, the driver of the vehicle has difficulty in grasping the projected image clearly.

SUMMARY OF THE INVENTION

In view of the above-described and other problems, the present disclosure provides a display apparatus that provides a clear image for a driver of a vehicle for the ease of recognition of information represented by the image.

In one aspect of the present disclosure, the display apparatus includes a reflector positioned for obstructing a front view of a driver by using an opaque material, a first imaging unit for imaging a front view of the vehicle, an image generation unit for generating a display image for a portion of the front view that is obstructed by the reflector, an image projection unit for projecting the display image generated by the image generation unit on the reflector, an information acquisition unit for acquiring information to be visually provided for the driver, and a combination unit for combining the information with the display image upon acquiring the information by using the information acquisition unit. In this manner, the driver of the vehicle is provided with a clear image projected on, for example, a frameless opaque reflector for recognizing the front view without moving his/her eyes. The image on the reflector is seamlessly combined with a real view from a driver's point of view and information acquired for provision for the driver is superposed thereon. The image having controlled quality according to user's preference may be provided for the driver for improved visibility without information superposed thereon.

In another aspect of the present disclosure, the reflector of the display apparatus is retracted from the use position on an occasion that requires a direct view of the front of the vehicle by the driver. The occasion for retracting the reflector is preferably detected by using an anomaly detection unit, and the reflector is retracted either automatically by an actuator or by manual operation to a retracted position that does not obstruct the driver's view. In this manner, the safety of driving the vehicle is secured on all occasions.

In yet another aspect of the present disclosure, the image to be projected on the reflector is controlled by having inputs from both of a visible light camera and an infrared camera for noise reduction or other processing. The inputs are preferably selected based on the luminosity around the vehicle, and images from both image sources are used for compensating image deficiency in each other's image. In this manner, objects of interest in the image are projected on the reflector in an edge enhanced manner with improved quality for various conditions where darkness due to a lack of daylight in the proximity of the vehicle is predominant or the like.

In still yet another aspect of the present disclosure, focal points of the first and the second imaging units are controlled to have the same value for the accuracy in the noise reduction from the image.

In still yet another aspect of the present disclosure, the degree of distortion on the reflector is adjusted under control of an operation device. The adjustment control of the image is stored in the storage for use in the image generation. In this manner, the image on the reflector is preferably adjusted so that the driver's view of the front of the vehicle looks seamless even when the reflector obstructs a portion of the driver's view.

In still yet another aspect of the present disclosure, a position mark is provided for suitably positioning the display image on the reflector. The position of the position mark is controlled by the operation device for an adjustment of a projection area of the image, and the adjusted projection area is framed by black pixels. In this manner, the image to be projected on the reflector has a reflection proof quality even when a portion of the image is projected toward an outside of the reflector.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the drawings. Like parts have like numbers in each of the embodiments.

Figure 1:
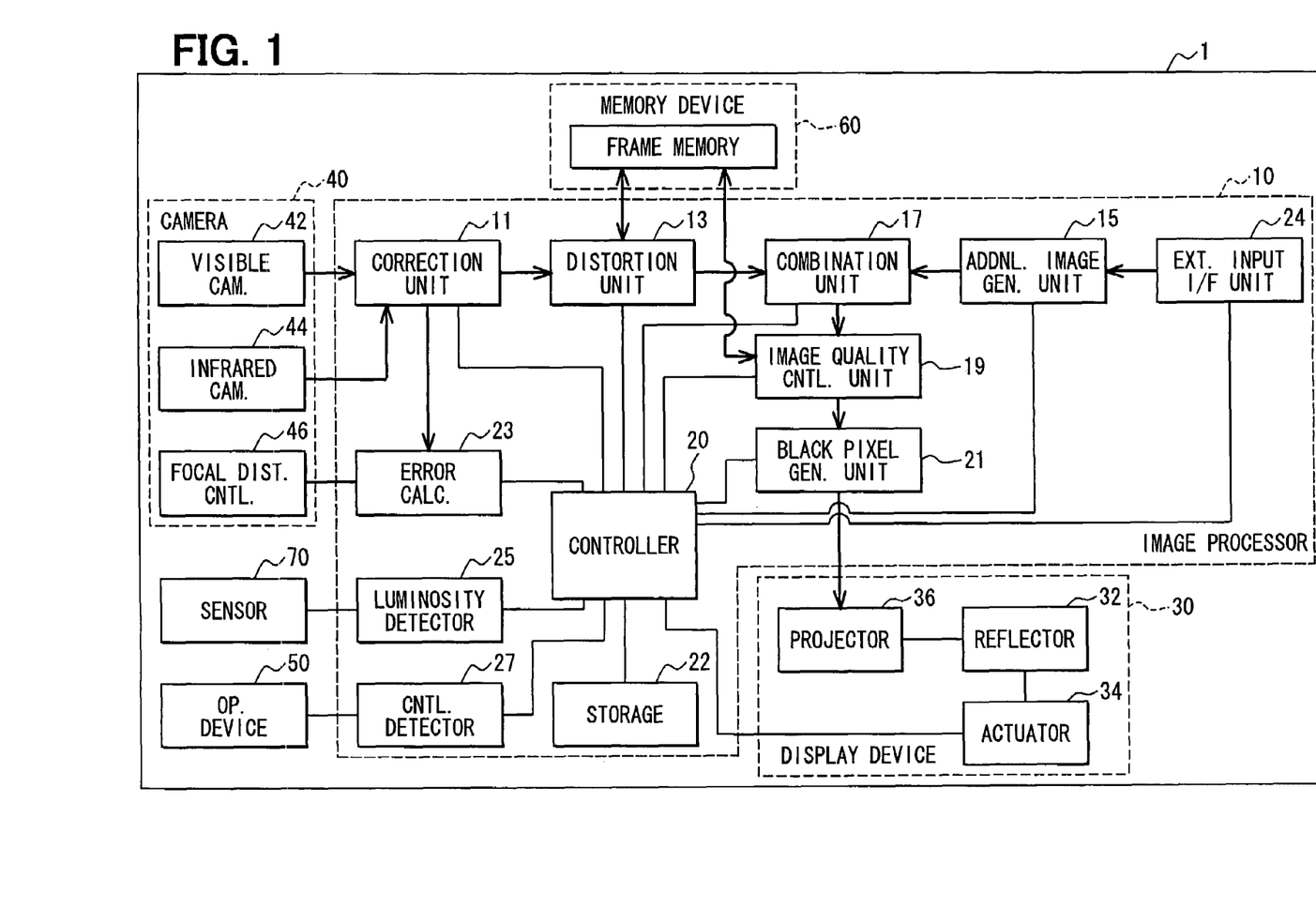
FIG. 1 shows a block diagram of the display apparatus for use in a vehicle in an embodiment of the present disclosure.
Figure 2A:
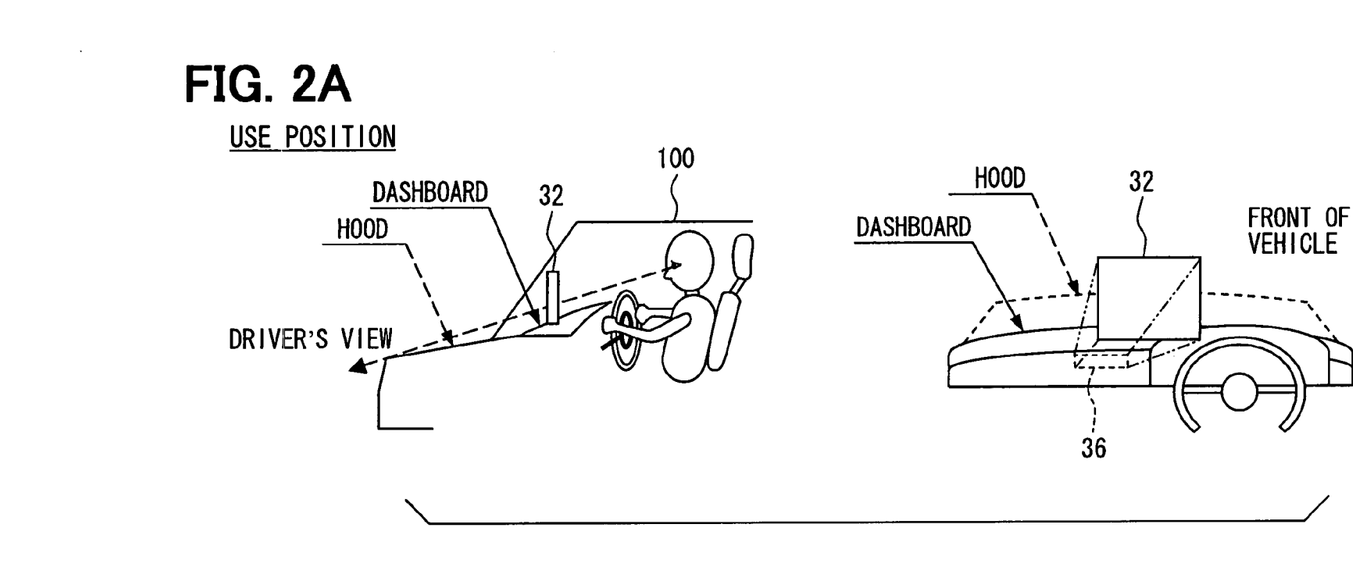
FIGS. 2A to 2B show illustrations of positions of a reflector in the vehicle.
Figure 2B:
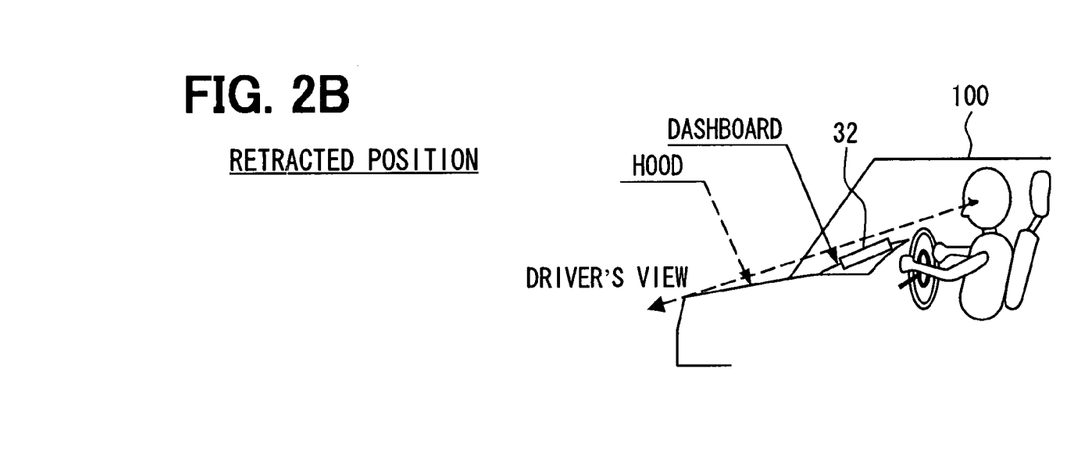
Figure 3:
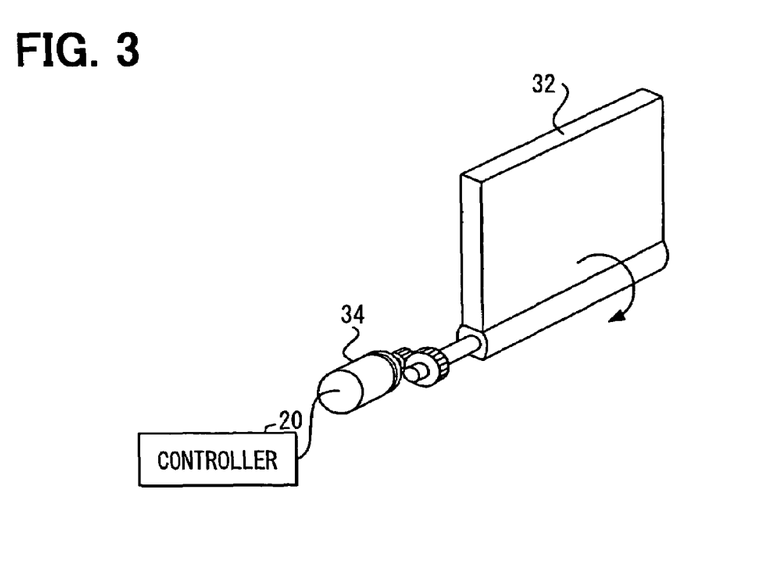
FIG. 3 shows a perspective view of an actuator in a display device.

FIG. 1 shows a block diagram of the display apparatus 1 for use in a vehicle 100 in an embodiment of the present disclosure. FIGS. 2A to 2B show illustrations of positions of a reflector 32 in the vehicle 100. FIG. 3 shows a perspective view of an actuator 34 in a display device 30.

The display apparatus 1 in the present embodiment includes the display device 30 having the reflector 32 for reflecting an image projected thereon, a camera 40 for imaging a front view of the vehicle 100, an image processor 10 that generates the image to be projected on the reflector 32 based on the image captured by the camera 40 and controls various devices in the display apparatus 1, an operation device 50 for receiving an input and/or information from a user of the vehicle 100 such as a driver or the like, a memory device 60 for providing plural sets of a frame memory that stores a single frame as a set of pixel information, a light sensor 70 for detecting light in the proximity of the vehicle 100 as shown in FIG. 1. The display apparatus 1 projects on the reflector 32 the image of the front view of the driver in a driver's seat of the vehicle 100 as shown in FIG. 2A. That is, the reflector 32 in the front view of the driver at least partially obstructs the front view of the driver, and an obstructed portion of the front view is projected on the reflector 32. Further, when traffic information, warnings or the like is provided for the driver, the information or the like in combination with the obstructed portion of the front view is also projected on the reflector 32 for visual recognition by the driver.

The display device 30 includes the reflector 32 made with an opaque material and disposed on a dashboard, the actuator 34 in the dashboard for actuating the reflector 32 back and forth between two positions, and a projector 36 having a liquid crystal display (LCD) for projecting the image on the reflector 32. One of the two positions of the reflector 32 is, as shown in FIG. 2A, a use position for having a reflection surface of a mirror to be positioned in the front view of the driver for the visual recognition by the driver without causing the driver to turn away from a front of the vehicle 100 (i.e., a reflection surface of a mirror (the reflector 32) positioned substantially perpendicularly to a look direction of the driver), and the other of the two positions is, as shown in FIG. 2B, a retracted position that does not obstacle the front view of the driver (i.e., the reflection surface of the mirror (the reflector 32) positioned in parallel with the look direction).

The reflector 32 is a mirror having no frame in a rectangular form, and has a rotation shaft along one of four edges of the rectangular form. The rotation shaft aligned substantially perpendicularly to the look direction of the driver is disposed on the dashboard. Therefore, the reflector 32 is being rotatable about the rotation shaft on the dashboard.

The actuator 34 is a motor in association with an end of the rotation shaft of the reflector 32 through a gear as shown in FIG. 3. The actuator 34 moves the reflector 32 between the use position and the retracted position upon receiving a control signal from a controller 20 of the image processor 10 that will be described later.

The projector 36 includes the liquid crystal display (LCD) for projecting an image generated on the LCD toward the reflector 32 as shown in FIG. 2A. In addition, a surface of the LCD has a polarizing filter for preventing the light from being projected away other than a direction of the reflector 32 due to an external incident light that comes in from an upward direction or a oblique direction. Further, the projector 36 includes a light sensor (e.g., a CDS) for detecting a normal operation of a back light. The projector 36 projects on the display device 30 an inputted image that is inputted from the image processor 10.

The camera 40 includes a visible camera 42 having a two-dimensional color imaging device, an infrared camera 44 having a two-dimensional infrared imaging device, and a focal distance controller 46 for controlling a focal distance of respective cameras 42, 44. Each of the two cameras 42, 44 is positioned for being capable of imaging the front view of the driver, that is, the front view seen by the driver when the reflector 32 is positioned in the retracted position.

The camera 40 images the front view of the vehicle 100 by using each of the respective cameras 42, 44, and inputs both of a color image taken by the visible camera 42 that images the front view of the vehicle 100 and an infrared image of the same front view into the image processor 10. The color image is also mentioned as a front image hereinafter in association with the infrared image of the same area.

The image processor 10 has an error calculator 23 that calculates an error of the focal distance of respective cameras 42, 44 in the camera 40 based on a comparison of the color image and the infrared image and inputs an error into the camera 40 after calculation. The focal distance controller 46 controls each of the two cameras 42, 44 to have the same focal distance upon receiving the error of the focal distance from the error calculator 23.

The operation device 50 is, for example, a remote controller with various operation buttons, a liquid crystal display equipped with a touch panel function or the like. The user such as the driver of the vehicle 100 inputs various instructions to the image processor 10 by the operation device 50.

The image processor 10 includes a front image correction unit 11, a front image distortion unit 13, an additional image generation unit 15, an image combination unit 17, an image quality control unit 19, a black pixel generation unit 21, the error calculator 23, an external input interface unit 24, a luminosity detection unit 25, a control detection unit 27, a controller 20 and a storage 22. The front image correction unit 11 removes a noise from the front image, and the front image distortion unit 13 distorts the front image according to an adjustment control. The additional image generation unit 15 generates an additional image for various information that is to be recognized by the driver based on an input from an external instruction source, and the image combination unit 17 combines the front image and the additional image. The image quality control unit 19 controls a quality of an inputted image according to the adjustment control, and the black pixel generation unit 21 controls a projection area of the inputted image by turning pixels in a portion of the inputted image to black pixels. The error calculator 23 calculates an error of a focal distance of each of the respective cameras 42, 44 in the camera 40 based on an input of the front image and the infrared image, and the external input interface unit 24 selectively acquires information provided from an external device. The luminosity detection unit 25 quantizes the luminosity in the proximity of the vehicle 100 based on a detection value of an external light sensor 70, and the control detection unit 27 detects various instructions from the operation device 50. The controller 20 made of a microcomputer with a CPU, a RAM, a ROM and the like controls components described above, and the storage 22 including a non-volatile memory and the like stores configuration values of the adjustment control and the like.

The image processor 10 also includes a clock generation unit (not shown in the figure) for generating a clock signal that is provided for the above components. Each of the above components starts its operation upon having a start instruction from the controller 20, and are operated according to the clock signal provided by the clock generation unit.

The front image correction unit 11 removes the noise in the front image by using the infrared image. That is, a random spot noise caused by an imaging with the color imaging device in an insufficient lighting condition is removed from the image by the correction unit 11.

Figure 4:
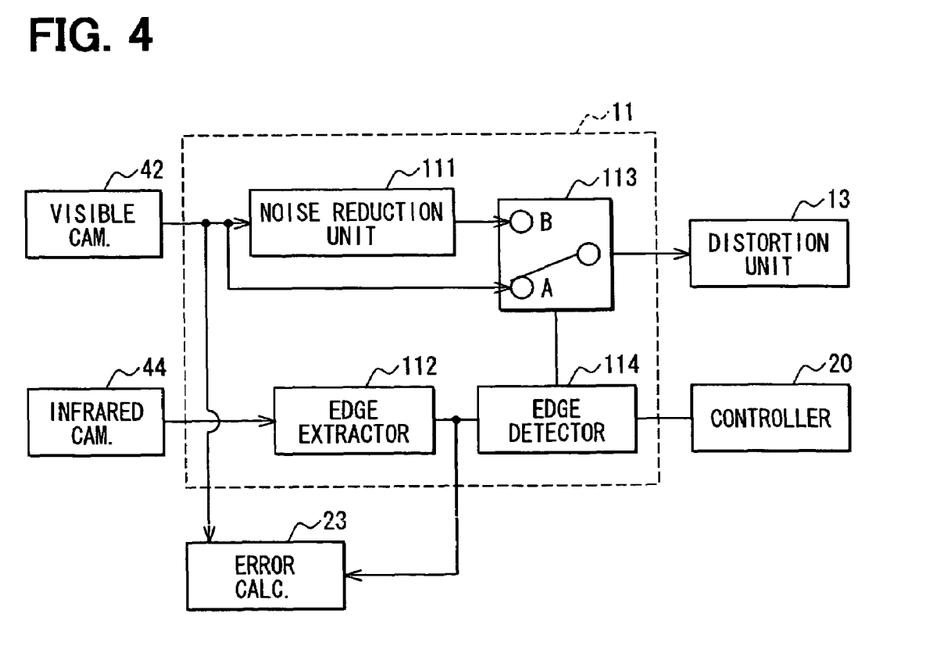
FIG. 4 shows a block diagram of a front image correction unit.

FIG. 4 shows a block diagram of the front image correction unit 11. The front image correction unit 11 includes, as shown in FIG. 4, a noise reduction unit 111, an edge extraction unit 112, a switch 113, and an edge detection unit 114.

The noise reduction unit 111 has a filter (e.g., a LPF) that removes the noise by averaging pixel values, and removes the noise from the front image that is inputted from the visible camera 42 by using a unit of single pixel.

The edge extraction unit 112 has a filter (e.g., a HPF) that emphasizes an outline of an image, and emphasizes the outline of the image inputted from the infrared camera 44 by using a unit of single pixel.

The switch 113 is used for switching an input from the noise reduction unit 111 and an input from the visible camera 42 based on an instruction from the edge detection unit 114.

The edge detection unit 114 determines whether each pixel is an edge pixel in an outline of an object or is a pixel other than the edge pixel (e.g., a pixel that represents a surface texture of the object or the like) based on the pixel value of each pixel in the infrared image having the emphasized outline after processing in the edge extraction unit 112 by examining the pixel value one by one.

The edge detection unit 114 switches the switch 113 to be coupled with a contact A for outputting the inputted pixel to the front image distortion unit 13 as it is when the inputted pixel is the edge pixel.

The edge detection unit 114 switches the switch 113 to be coupled with a contact B for outputting the pixel after the processing in the noise reduction unit 111, that is, the pixel without having the random spot noise after averaging the pixel values, when the inputted pixel is not the edge pixel.

Therefore, the edge pixel of the object is not filtered before output, and the other pixels is filtered before output. As a result, the front image in the output is free from the random spot noise, and has a clear image with the emphasis on its outline. Further, the operation of the edge detection unit 114 controlled by the controller 20. Therefore, the switch 113 is coupled with the contact A while the edge detection unit is not in operation for outputting the pixel from the visible camera 42 to the front image distortion unit 13 as it is.

Further, the front image from the visible camera 42 and the infrared image from the edge extraction unit 112 are also outputted to the error calculator 23.

Figure 7A:
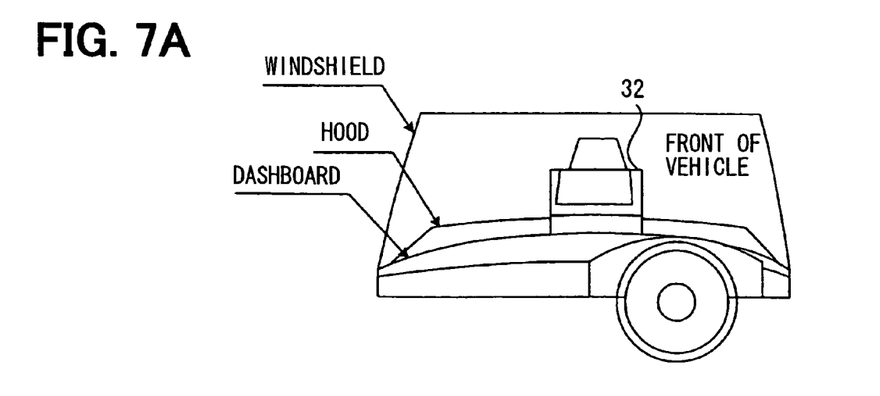
FIGS. 7A to 7C show illustrations of the front image projected on the reflector.
Figure 7B:
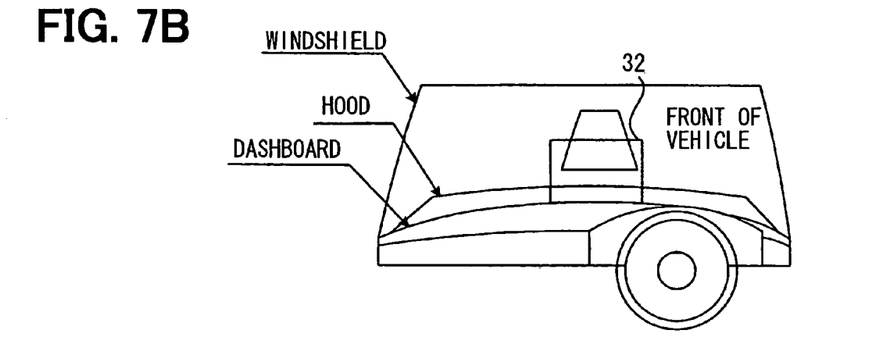
Figure 7C:
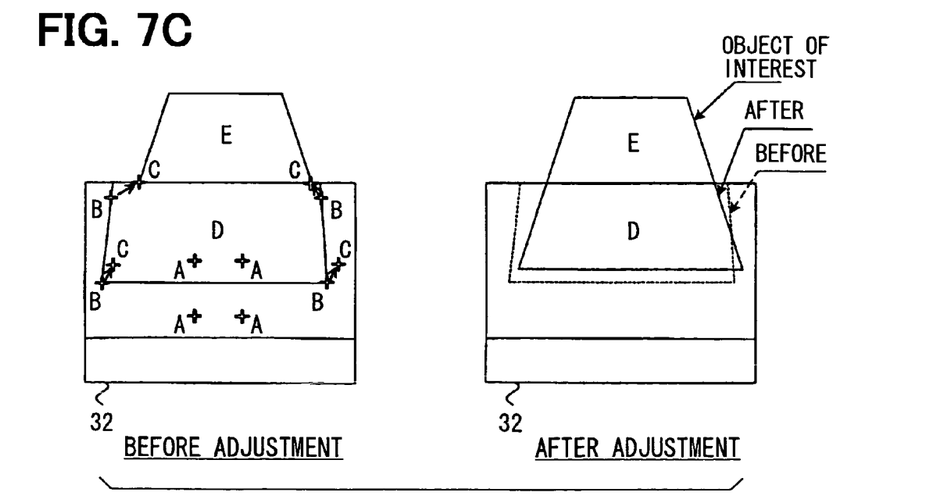

The front image distortion unit 13 controls distortion of the front image for connecting the front view of the driver through a windshield and the scene in the image projected on the reflector 32 according the adjustment control of a predetermined value (refer to FIG. 7).

More practically, the front image distortion unit 13 acquires the front image from the front image correction unit 11, and stores the front image in the frame memory of the memory device 60 temporarily. Then, the distortion of the front image is adjusted as the front image distortion unit 13 reads the front image from the memory device 60 for outputting the image to the image combination unit 17. At this point, the front image distortion unit 13 uses the adjustment control stored in a register provided therewith, that is, an expansion rate and a center position for each scanning line in horizontal and vertical directions, for adjusting the distortion of the front image. In this case, each of the drivers sets the adjustment control for his/her own convenience with the reflector 32 in one's view through an operation under control of the operation device control process (described later) by having the operation of the driver on the operation device 50.

The additional image generation unit 15 acquires the information that is outputted from the external input interface unit 24, and generates an additional image to be combined with the front image based on the acquired information. For example, traffic information in a traveling direction of the vehicle 100 is displayed at a predetermined position in the front image as the additional image after acquisition. In this case, the pixels for composing the additional information are marked with control information that designates that the pixel is for information display purpose when the pixels are outputted to the image combination unit 17.

The controller 20 controls generation of a mark image when a mark image generation instruction is inputted through an operation under control of the operation device control process. That is, the mark image including images of four crosses at arbitrary positions is generated under the generation instruction, is changed in positions according to a mark position change instruction when the change instruction is inputted, and is maintained to be generated until a mark image erase instruction is inputted.

The image combination unit 17 combines the additional image from the additional image generation unit 15 and the front image from the front image distortion unit 13, and outputs the combined image to the image quality control unit 19. That is, the image combination unit 17 is equipped with a multiplexer function that selectively outputs one of the pixel in the front image from the front image distortion unit 13 and the pixel in the additional image from the additional image generation unit 15 for selective output of the pixels in the acquired images from both of the front image distortion unit 13 and the additional image generation unit 15. Therefore, when the pixels in the additional image have the control information associated therewith, the pixels in the additional image are outputted, and when there is no control information with the pixels, that is, when the pixels are used for drawing a background in the image, the pixels in the front image are outputted. In this case, when the image is inputted only from the front image distortion unit 13, the inputted front image is outputted to the image quality control unit 19 as it is.

The image quality control unit 19 acquires the image from the image combination unit 17, and outputs the image to the black pixel generation unit 21 after controlling image quality such as outline emphasis, color, contrast, brightness and the like. The image quality control unit 19 has a register for storing predetermined values of the adjustment controls of the image quality.

The adjustment control stored in the register is set for respective drivers with the reflector 32 in his/her view through the operation under control of the operation device control process (described later) by having the operation of the driver on the operation device 50. The adjustment control may take account of the luminosity in the proximity of the vehicle 100 sensed by the external light sensor 70 for the improvement of the visibility of the front image on the reflector 32.

The black pixel generation unit 21 turns the pixels in the image outside of the projection area to black pixels for preventing a residual image from being reflected on the windshield or the like.

Figure 8A:
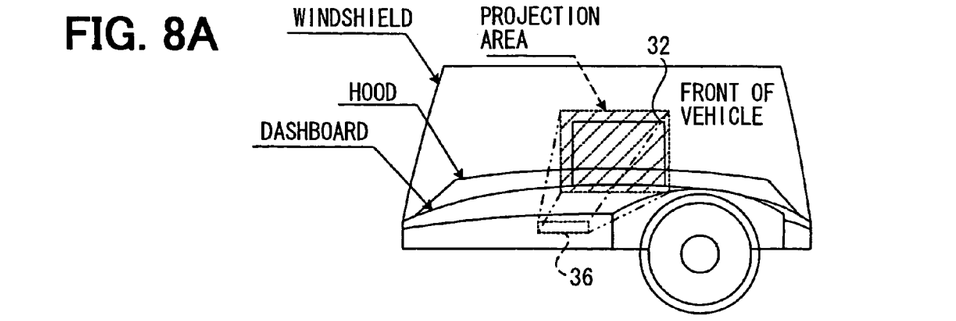
FIGS. 8A to 8B show illustrations of driver's views with a front image projected on the reflector.
Figure 8B:
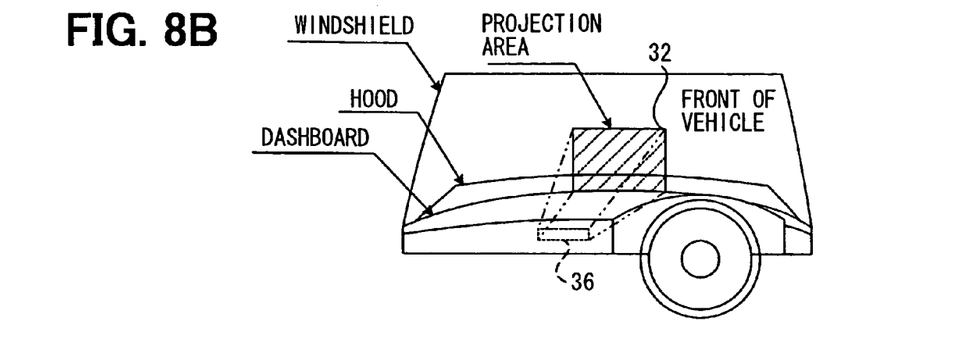
Figure 8C:
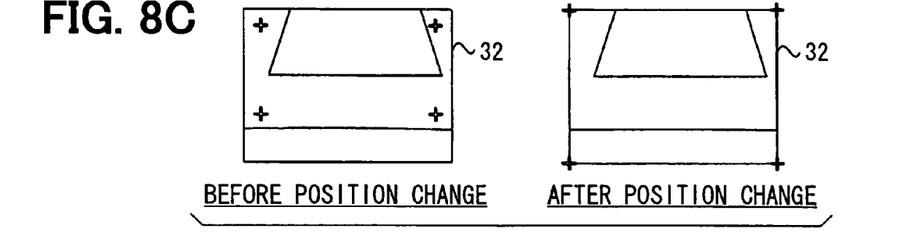
FIG. 8C shows an illustration of an image projected on the reflector.
Figure 8D:
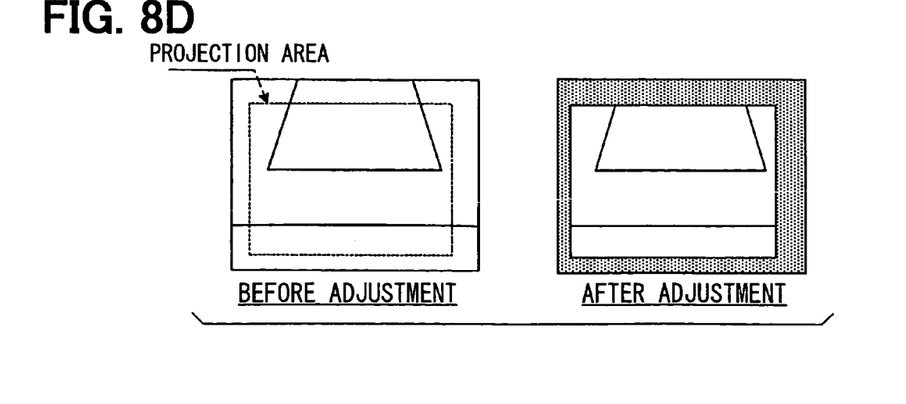
FIG. 8D shows an illustration of an image displayed on a projector.

That is, the black pixel generation unit 21 acquires the image from the image quality control unit 19, and outputs the image to the projector 36 after turning the pixels outside of the projection area to black pixels based on the pixel information, i.e., coordinates of the pixels outside of the projection area, as shown in FIG. 8D. In this case, the black pixel generation unit 21 has a register for storing the coordinates of the pixels for use in a process for generating the black pixels. The coordinates of the pixels is set for respective drivers for respective drivers with the reflector 32 after turning in his/her view through the operation under control of the operation device control process (described later) by having the operation of the driver on the operation device 50.

The error calculator 23 acquires the front image from the noise reduction unit 111 and the infrared image after the outline emphasizing process, filters the front image (e.g., HPF or the like) for outline emphasis, and detects the error of the infrared image relative to the front image by comparing the pixels of the outlines in the both images. Then, the error of the focal distance of each of the two cameras 42, 44 in the camera 40 based on the error of the outline pixels. The error of the focal distance is outputted to the camera 40.

The external input interface unit 24 selects the external device based on the instruction from the controller 20, and acquires information from the external device. In the present embodiment, the external device is one or more of a car navigation system that provides traffic guidance such as intersection information in, for example, the traveling direction of the vehicle 100, subject vehicle information such as a current position of the vehicle 100, road condition information of the traveling road, vehicle speed information of the subject vehicle and the like, a vehicle control system that provides various information such as driving condition of the vehicle, and the like.

Figure 5:
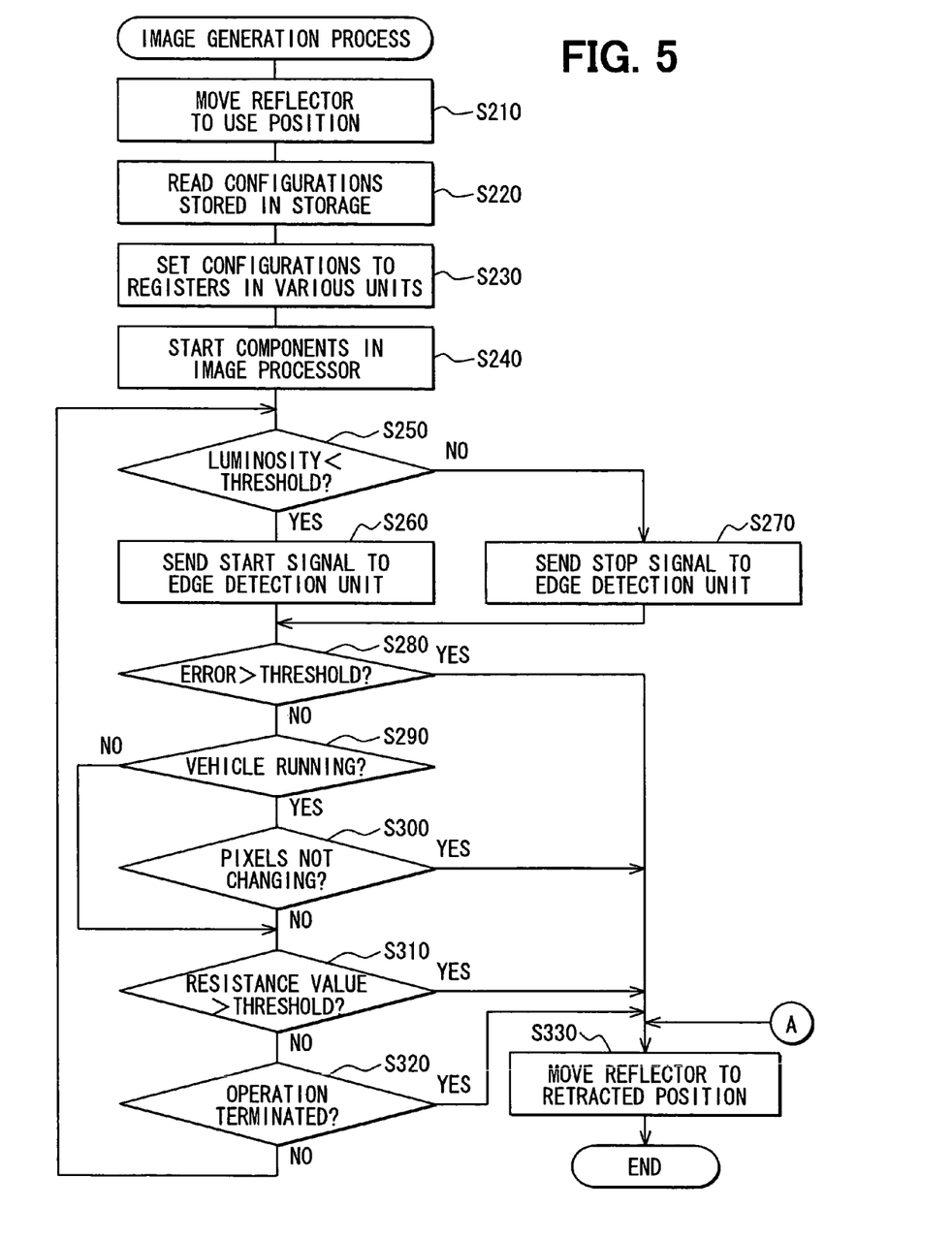
FIG. 5 shows a flowchart of an image generation process in a controller.

The image generation process executed in the controller 20 in the image processor 10 is described with reference to the flowchart in FIG. 5. The image generation process is started when the vehicle 100 is in operation and the display apparatus 1 is invoked.

In step S210, the process sends a control signal to the actuator 34 for rotating the reflector 32 from the retracted position to be in the use position.

In step S220, the process reads various configurations stored in the storage 22.

In step S230, the process sets the various configurations to the registers in the front image distortion unit 13, the image quality control unit 19, and the black pixel generation unit 21.

In step S240, the process starts the components in the image processor 10.

In step S250, the process determines whether the luminosity of the external light quantized by the luminosity detection unit 25 is smaller than a predetermined threshold value. The process proceeds to step S260 when the luminosity is smaller than the predetermined value (step S250:YES). The process proceeds to step S270 when the luminosity is not smaller than the predetermined value (step S250:NO).

In step S260, the process sends a start signal to the edge detection unit 114 in the front image correction unit 11.

In step S270, the process sends a stop signal to the edge detection unit 114 in the front image correction unit 11. In this case, the predetermined threshold value is set to be a minimum luminosity value of the external light that allows the visible camera 42 to capture a normal image. Therefore, when the luminosity of the external light is equal to or greater than the threshold value, the operation of the edge detection unit 114 is stopped and the image from the visible camera is sent to the front image distortion unit 13 as it is because there is no need to reduce the noise in the image.

In step S280, the process determines whether the error calculated in the error calculator 23 is greater than a predetermined threshold value. The process proceeds to step S330 when the error is greater than the predetermined value (step S280:YES), because the error greater than the threshold value indicates that the discrepancy in the focal distance adjustment of the visible camera 42 and the infrared camera 44, and thus indicates the anomaly of the camera 40 and the display apparatus 1. The process proceeds to step S290 when the error is not smaller than the predetermined value (step S280:NO).

In step S290, the process determines whether the vehicle 100 is running based on, for example, the vehicle speed detected by a speed sensor. The process proceeds to step S300 when the vehicle 100 is running (step S290:YES). The process proceeds to step S310 when the vehicle is not running (step S290:NO).

In step S300, the process determines whether all of the pixels of the liquid crystal display in the projector 36, that is, the pixels at four corners, are not changing for a predetermined period. The process proceeds to step S330 when all pixels are not changing for the predetermined period (step S300:YES), because that indicates the anomaly of the display device 30. This is because the front image of the vehicle 100 captured by the camera 40 should always be changing while the vehicle 100 is running, and thus the pixels of the projector 36 should always be changing when the display apparatus 1 is in normal operation. The process proceeds to step S310 when at least one of the four pixels changes (step S300:NO).

In step S310, the process determines whether a resistance value of a light sensor in the projector 36 is greater than a predetermined threshold value. The process proceeds to step S330 when the resistance value is greater than the threshold value (step S310:YES), because that indicates a malfunction of a back light of the liquid crystal display, i.e., the anomaly in the display device 30. The process proceeds to step S320 when the resistance value is not greater than the threshold value (step S310:NO).

In step S320, the process determines whether the operation of the display apparatus 1 is terminated based on an instruction from an external control device or the like. The process proceeds to step S330 when the operation of the display apparatus 1 is terminated (step S320:YES). The process returns to step S250 when the operation of the display apparatus 1 is not terminated (step S320:NO), and repeats the process from step S250.

In step S330, the process sends a control signal to the actuator 34 for rotating the reflector 32 from the use position to the retracted position, and concludes the process itself.

Figure 6:
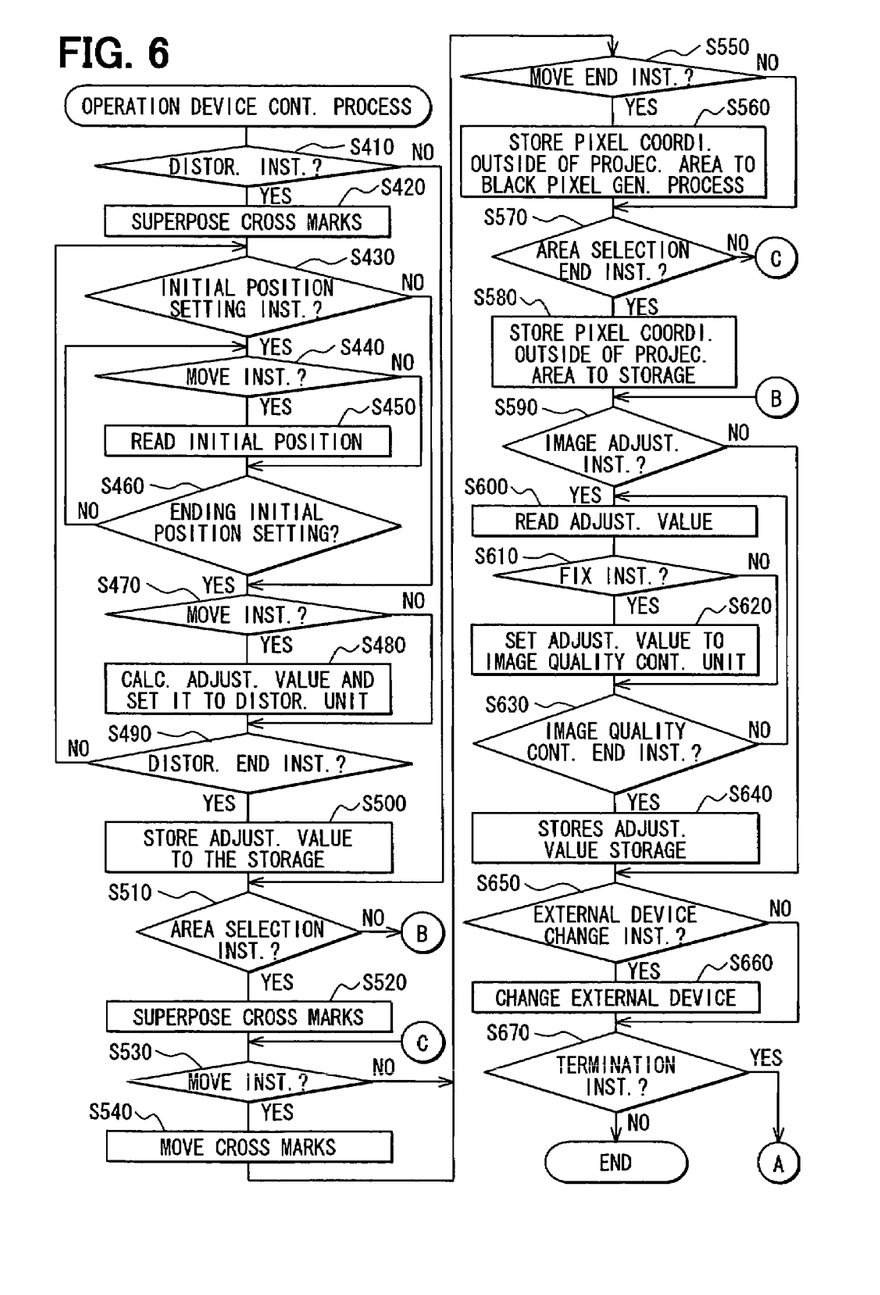
FIG. 6 shows a flowchart of an operation device control process in the controller.

The operation device control process by the controller 20 in the image processor 10 is described with reference to the flowchart in FIG. 6. The operation device control process is started when an external instruction inputted from the operation device 50 is detected by the control detection unit 27.

In step S410, the process in the controller 20 determines whether the detected instruction is a distortion instruction of the image. The process proceeds to step S420 when the detected instruction is the distortion instruction (step S410:YES). The process proceeds to step S510 when the detected instruction is not the distortion instruction (step S410:NO).

In step S420, the process sends a mark image generation instruction to the additional image generation unit 15. In this manner, four crosses A as shown in FIG. 7C are displayed in the image generated on the projector 36 at arbitrary positions respectively in a selectable manner. At this point, the image projected on the reflector 32 and the front view of the driver through the windshield is not connected as shown in FIG. 7A and by a left side illustration in FIG. 7C.

In step S430, the process selects one of the four crosses A by the operation of the operation device 50, and determines whether an initial position setting instruction for setting an initial position of the selected cross A is inputted. The process proceeds to step S440 when the setting instruction is inputted (step S430:YES). The process proceeds to step S470 when the setting instruction is not inputted (step S430:NO).

In step S440, the process determines whether a move instruction for moving the cross A is inputted. The process proceeds to step S450 when the move instruction is inputted (step S440:YES). The process proceeds to step S460 when the move instruction is not inputted (step S440:NO).

In step S450, the process sends a position change instruction to the additional image generation unit 15 according to the operation of the operation device 50 for changing the position of the superposing mark image, and reads the position of the cross A (i.e., the mark image) after the position change. In this case, when the initial position of the cross A is not set, the position of the cross A displayed in step S420 is used as the initial position.

In step S460, the process determines whether an end instruction for ending the initial position setting is inputted. The process proceeds to step S470 when the end instruction is inputted (step S460:YES). The process returns to step S440 when the end instruction is not inputted (step S460:NO).

In step S470, the process determines whether the move instruction for moving a cross B after selecting one of the four crosses B. The process proceeds to step S480 when the move instruction is inputted (step S470:YES). The process proceeds to step S490 when the move instruction is not inputted (step S470:NO).

In step S480, the process sends the position change instruction to the additional image generation unit 15 according to the operation of the operation device 50 for changing the position of the superposing mark image, and sets the control adjustment including an expansion rate and a center position of each scanning line in the horizontal and vertical directions to the register in the front image distortion unit 13. The expansion rate and the center position are calculated based on the amount of movement of the cross B from the initial position.

That is, the driver operates the operation device 50 for setting the initial position of the cross B as shown in FIG. 7C, and then, the driver operates the operation device 50 for moving the crosses B to the positions of crosses C so that a real image of the object directly seen by the driver, i.e., a portion E in FIG. 7C, and the projected image on the reflector 32, i.e., a portion D in FIG. 7C, look seamlessly to the driver. The controller 20 calculates the control adjustment based on the movement of the crosses B, and sets the adjustment value to the front image distortion unit 13. In this manner, the front image is distorted according to the adjustment value and is projected on the reflector 32 by the projector 36 as a continuous image with a directly seen portion E of the object.

In step S490, the process determines whether an distortion end instruction is inputted. The process proceeds to step S500 when the distortion end instruction is inputted (step S490: YES). The process returns to step S430 when the distortion end instruction is not inputted (step S490:NO). In addition, when the distortion instruction is not detected in step S410, the process proceeds to step S510.

As described above, FIG. 7A shows an illustration of an image before distortion projected on the reflector 32, and FIG. 7b shows an illustration of an image after distortion projected on the reflector 32. Further, FIG. 7C shows illustrations of the images on the reflector 32 when the distortion instruction is inputted.

In step S500, the process sends a mark image erase instruction to the additional image generation unit 15 for erasing the cross mark and storing the adjustment value to the storage 22.

In step S510, the process determines whether an area selection instruction for selecting an image projection area is detected. The process proceeds to step S520 when the area selection instruction is detected (step S510:YES). The process proceeds to step S590 when the area selection instruction is not detected (step S510:NO).

In step S520, the process sends a mark image generation instruction for displaying the four crosses in the image displayed on the projector 36 to the additional image generation unit 15 as shown by a left side illustration in FIG. 8C. In this case, the size of the image projection area exceeds the size of the reflector 32 as shown in the illustration in FIG. 8A.

In step S530, the process determines whether the driver inputted the move instruction for moving the crosses by operating the operation device 50. The process proceeds to step S540 when the move instruction is inputted (step S530:YES). The process proceeds to step S550 when the move instruction is not Inputted (step S530:NO).

In step S540, the process sends the position change instruction to the additional image generation unit 15 for changing the position of the crosses superposed on the image according to the operation of the operation device 50.

In step S550, the process determines whether the position change instruction for changing the position of the crosses is terminated. The process proceeds to step S560 when the instruction is terminated (step S550:YES). The process proceeds to step S570 when the instruction is terminated (step S550:NO).

In step S560, the process determines the image projection area based on the positions of the crosses after the position change as shown in FIG. 8D, and the coordinates of pixel positions in the area outside of the image projection area are stored in the register in the black pixel generation unit 21.

More practically, the driver operates the operation device 50 for changing the position of each the four crosses toward four corners of the reflector 32 by the position change instruction, and terminates the position change instruction as shown by a right side illustration in FIG. 8C. Then, the controller 20 determines the image projection area for setting the coordinates of the pixel positions outside of the image projection area to the black pixel generation unit 21. Then, the black pixel generation unit 21 turns the pixels having the stored coordinates to black and outputs the pixel data to the projector 36. As a result, the image displayed on the projector 36 has a black portion for the area that is positioned outside of the image projection area as shown by the right side illustration in FIG. 8D, and the size of the image projection area is matched with the size of the reflector 32 as shown in FIG. 8B.

In step S570, the process determines whether the image area selection is terminated. The process proceeds to step S580 when the image area selection is terminated (step S570: YES). The process returns to step S530 when the image area selection is not terminated (step S570:NO). Further, when the projection area selection is not instructed in step S510, the process proceeds to step S590.

In step S580, the process sends a mark erase instruction to the additional image generation unit 15 for erasing the crosses, and stores the coordinates of the area that exists outside of the projection area to the storage 22.

FIG. 8C shows the illustration of image projected on the reflector 32 when the area selection instruction is terminated.

As described above, FIG. 8A shows the illustration of the driver's view when the image before adjustment is projected on the reflector 32, and FIG. 8B shows the illustration of the driver's view when the image after adjustment is projected on the reflector 32. Further, FIG. 8C shows the illustrations of the images projected on the reflector 32 when the area selection instruction is inputted, and FIG. 8D shows the illustrations of the images displayed on the projector 36 when the area selection instruction is inputted.

In step S590, the process determines whether an image adjustment instruction is detected by the control detection unit 27. The process proceeds to step S600 when the adjustment instruction is detected (step S590:YES). The process proceeds to step S650 when the adjustment instruction is not detected (step S590:NO).

In step S600, the process reads the inputted adjustment value.

In step S610, the process determines whether a fix instruction is inputted. The process proceeds to step S620 when the fix instruction is inputted (step S610:YES). The process proceeds to step S630 when the fix instruction is not inputted (step S610:YES).

In step S620, the process stores the adjustment value in the register in the image quality control unit 19.

More practically, the driver operates the operation device 50 for controlling the image quality, the adjustment value is stored in the image quality control unit 19 and the image after adjustment according to the stored adjustment value is displayed on the projector 36. In this manner, the image with the adjusted image quality is projected on the reflector 32.

In step S630, the process determines whether the image quality control is terminated. The process proceeds to step S640 when the image quality control is terminated (step S630:YES). The process returns to step S600 when the image quality control is not terminated (step S630:NO). Further, the image quality control is not instructed in step S590, the process proceeds to step S650.

In step S640, the process stores the adjustment value in the storage 22.

In step S650, the process determines whether a change instruction for changing the external device that provides information is detected by the control detection unit 27. The process proceeds to step S660 when the change instruction is detected (step S650:YES). The process proceeds to step S670 when the change instruction is not detected (step S650:NO). Further, when the change instruction is not detected in step S650, the process proceeds to step S670.

In step S660, the process sends the change instruction for changing the external device to the external input interface 24.

In step S670, the process determines whether the operation of the display apparatus 1 is terminated by the control detection unit 27. The process proceeds to step S330 in FIG. 5 and retracts the reflector 32 to the retracted position (step S670:YES). The process concludes itself when the operation is not terminated (step S670:NO).

The display apparatus 1 in the present embodiment has the opaque reflector 32 at a position that obstacles the driver's view in front of the driver. Then, the front image of the vehicle 100 is captured by the visible camera 42, and the image processor 10 generates a portion of the driver's view obstructed by the reflector 32 as an image based on the image captured by the visible camera 42. In this manner, the obstructed portion of the driver's view is projected on the reflector 32 by the projector 36. Further, information from the external device to be presented for the driver is added to the original image on the reflector 32 by combining the original image and the additional image for displaying the information under control of the image processor 10.

The information acquired from the external device to be recognized by the driver is combined with the image of the driver's view to be projected on the reflector 32. Therefore, the driver can recognize the obstructed portion of the driver's view and the information only by watching a clear image projected on reflector 32 that is made of an opaque material such as a mirror in the driver's view. In this manner, the driver of the vehicle 100 with the assistance of the display apparatus 1 can securely recognize the information without moving the eye away from the front area of the vehicle 100.

Further, the front image and the additional image of the information are combined by exclusively selecting the pixels in one of the two images, thereby resulting in a clear combination of the two images on the reflector 32. That is, the image on the reflector 32 is recognized by the driver with an improved clarity in the view than the image that is projected on a transparent material such as the windshield or the like.

Furthermore, when the information is not provided from the external device, the obstructed portion of the driver's view is generated and projected on the reflector 32. Therefore, the driver's view is not obstructed in effect while driving the vehicle 100. In addition, the image on the reflector 32 is controlled to accommodate the driver's preference in terms of the image quality such as the color, contrast, brightness and the like based on a predetermined configuration. In this manner, the driver can recognized the front image with an improved clarity on the reflector 32 in comparison with the view through the windshield.

The image processor 10 has a function for detecting the anomaly of the display apparatus 1, and also has the actuator 34 that moves the reflector 32 between the use position that obstructs the driver's view and the retracted position that does not obstruct the driver's view. When the anomaly is detected by the image processor 10, the reflector 32 is retracted to the retracted position, thereby providing a safe driving condition for the driver even when the anomaly is detected in the display apparatus 1.

Furthermore, the visible camera 42 is supplemented by the infrared camera 44 and the light sensor 70. Therefore, the front image based on the image from the visible camera 42 is supplemented by the infrared image from the infrared camera 44, and the noise in the front image is reduced when the luminosity around the vehicle is smaller than a predetermined threshold value. In this manner, the front image projected on the reflector 32 has a clarity even when the outside of the vehicle 100 is in a dark condition. In addition, the focal distance of the camera 40, that is, the focal distances of the visible camera 42 and the infrared camera 44, is adjusted for accurately reducing the noise in the image.

The image processor 10 allows for the driver an interactive distortion of the image on the reflector 32 by having an input from the operation device 50, and the adjustment value inputted by the driver is stored in the storage 22. Therefore, the driver can control the image on the reflector 32 to be precisely combined with a direct view through the windshield. In this manner, the driver's view is securely provided and is maintained to be identical with the view without the reflector 32.

The interactive distortion by the driver with the operation device 50 is supported by the crosses superposed on the image on the reflector 32 under control of the image processor 10. That is, the position of the projection area is defined by using the crosses controlled by the operation device 50, and the pixels outside of the projection area are turned to black with the coordinates stored in the storage 22. In this manner, the projection area of the image is precisely defined to have the size of the reflector 32, and is prevented from being reflected on the windshield or the like. That is, the projection of the image on the windshield that causes an obstruction in the driver's view is prevented.

Although the present invention has been fully described in connection with the preferred embodiment thereof with reference to the accompanying drawings, it is to be noted that various changes and modifications will become apparent to those skilled in the art.

For example, the information that is combined with the front image may be different from the information such as the traffic information, the speed information or the like that is derived from the external device. That is, for example, an image of a far front area, i.e., an area that is several hundred meters ahead of the vehicle 100, may be captured by the camera 40 and processed to be combined with the front image. In this manner, the area that cannot be directly seen by the driver can be provided for the driver for his/her convenience.

In this case, the front image is expanded for accommodating the far front area in the additional image generation unit 15.

Further, a moving object in the image captured by the camera 40 may be detected and marked as an object of interest for the driver. In this manner, driver's attention is attracted to the moving object in the image.

Furthermore, the marker on the road, the road sign or the like may be detected in the image, and may be marked in the same manner as described above. In this manner, when the visibility of the driver is deteriorated by the external condition such as rain, darkness or the like, the image on the reflector 32 can clearly show the marker, the sign or the like for the driver's convenience.

Furthermore, the image on the reflector 32 may be replaced with the image described in the following.

That is, for example, an intersection image may be detected and expanded in the image captured by the camera 40 based on the information from a car navigation system, and the road marking such as an arrow that guides a running direction of the vehicle may be superposed on the intersection image on the reflector 32.

Furthermore, the far front image may be projected on an entire area of the reflector 32 by request from the driver.

Furthermore, the reflector 32 is made of the opaque material such as a mirror or the like in the embodiment described above. However, the reflector 32 may be made of a different material. That is, the reflector 32 may be disposed as a portion of the windshield with a film having variable transparency. In this manner, the windshield can reflect the clear image when the transparency is set to zero (not transparent), or can allow the driver to look therethrough when the transparency is set to one (i.e., completely transparent). In addition, the projector 36 may be composed of the liquid crystal display, or other type of projector that project the image. The projector 36 may be combined with another piece of mirror.

Furthermore, the reflector 32 may have a rectangular shape, or may have a shape other than the rectangle. In addition, the reflector 32 at the center of the dashboard may have a different size and position on the dashboard as long as they do not harm the safety of the driver or the occupant of the vehicle 100.

In the above embodiment, the display apparatus is applied to the vehicle for the left side traffic. However, the display apparatus may also be applied to the vehicle for a right side traffic.

Such changes and modifications are to be understood as being within the scope of the present invention as defined by the appended claims.

What is claimed is:

1. A display apparatus comprising:
   a reflector positioned for obstructing a front view of a driver by using an opaque material;
   a first imaging unit for imaging a front view of the vehicle;
   an image generation unit for generating a display image for a portion of the front view that is obstructed by the reflector;
   an image projection unit for projecting the display image generated by the image generation unit on the reflector;
   an information acquisition unit for acquiring information to be visually provided for the driver;
   a combination unit for combining the information with the display image upon acquiring the information by using the information acquisition unit; and
   a front image distortion unit configured to control distortion of the display image to connect the front view actually seen by the driver through the windshield and a scene in the display image projected on the reflector, the projected display image of the obstructed portion of the front view and the front view actually seen by the driver appearing to be seamless to the driver.

2. The display apparatus as in claim 1 further comprising:
   an anomaly detection unit for detecting anomaly of the display apparatus;
   an actuator for actuating the reflector to be positioned at two positions, wherein two positions includes a use position that obstructs the front view of the driver and a retracted position that allows the driver to have the front view; and
   an anomaly control unit for controlling the actuator to actuate the reflector to be positioned at the retracted position upon detection of the anomaly by the anomaly detection unit.

3. The display apparatus as in claim 1 further comprising:
   a second imaging unit for imaging a same area imaged by the first imaging unit as an infrared wavelength image, wherein the first imaging unit images the front view of the vehicle as a visible wavelength image;
   a luminosity detection unit for detecting luminosity in a proximity of the vehicle; and
   a noise reduction unit for reducing noise in the visible wavelength image imaged by the first imaging unit based on the infrared wavelength image imaged by the second imaging unit when the luminosity in the proximity of the vehicle is smaller than a predetermined value, wherein the image generation unit generates the display image based on an image having reduced noise after processing by the noise reduction unit.

4. The display apparatus as in claim 3 further comprising:
   a focus control unit for controlling a focal distance of the first imaging unit to have a same value as the focal distance of the second imaging unit.

5. The display apparatus as in claim 1 further comprising:
   a memory unit;
   the front image distortion unit for distorting the display image on the reflector by adjusting a distortion of the display image generated by the image generation unit upon having a distortion instruction from an external instruction source; and an adjustment control storage unit for storing an adjustment control of the distortion of the display image in the memory unit upon having a distortion fix instruction for fixing the distortion from the external instruction source, wherein the image generation unit generates the display image based on the adjustment control of the distortion of the display image stored in the memory unit.

6. The display apparatus in claim 1, the front image distortion unit distorting the display image by changing an expansion or contraction of the display image in a vertical and horizontal direction, and changing a center position of the display image.

7. A display apparatus comprising:
a reflector positioned for obstructing a front view of a driver by using an opaque material;
a first imaging unit for imaging a front view of the vehicle;
an image generation unit for generating a display image for a portion of the front view that is obstructed by the reflector;
an image projection unit for projecting the display image generated by the image generation unit on the reflector;
an information acquisition unit for acquiring information to be visually provided for the driver;
a combination unit for combining the information with the display image upon acquiring the information by using the information acquisition unit;
a memory unit;
a mark positioning unit for superposing a position mark on the display image generated by the image generation unit upon having an area selection instruction for selecting a projection area of the display image on the reflector from an external instruction source;
a mark adjustment unit for adjusting a position of the position mark superposed on the display image upon having an adjustment instruction from the external instruction source when the position mark is being superposed on the display image by the mark positioning unit; and
a projection area storage unit for determining the projection area of the display image on the reflector based on the position of the position mark superposed on the display image upon having an area fix instruction for fixing the projection area of the display image from the external instruction source when the position mark is being superposed on the display image by using the mark positioning unit, wherein pixels of the display image outside of the projection area are turned to black pixels, and pixel information of the pixels outside of the projection area is stored in the memory unit, wherein the pixels of the display image in association with the pixel information that is stored in the memory unit are projected as the black pixels when the image projection unit projects the display image on the reflector.

8. The display apparatus as in claim 7 further comprising:
an anomaly detection unit for detecting anomaly of the display apparatus;
an actuator for actuating the reflector to be positioned at two positions, wherein two positions includes a use position that obstructs the front view of the driver and a retracted position that allows the driver to have the front view; and
an anomaly control unit for controlling the actuator to actuate the reflector to be positioned at the retracted position upon detection of the anomaly by the anomaly detection unit.

9. The display apparatus as in claim 6 further comprising:
a second imaging unit for imaging a same area imaged by the first imaging unit as an infrared wavelength image, wherein the first imaging unit images the front view of the vehicle as a visible wavelength image;
a luminosity detection unit for detecting luminosity in a proximity of the vehicle; and
a noise reduction unit for reducing noise in the visible wavelength image imaged by the first imaging unit based on the infrared wavelength image imaged by the second imaging unit when the luminosity in the proximity of the vehicle is smaller than a predetermined value,
wherein the image generation unit generates the display image based on an image having reduced noise after processing by the noise reduction unit.

10. The display apparatus as in claim 9 further comprising:
a focus control unit for controlling a focal distance of the first imaging unit to have a same value as the focal distance of the second imaging unit.

* * * * *